United States Patent [19]

Sauer

[11] 4,265,852
[45] * May 5, 1981

[54] PROCESS FOR FORMING A PLASTIC ARTICLE

[75] Inventor: Donald G. Sauer, Harwinton, Conn.

[73] Assignee: National Can Coporation, Chicago, Ill.

[*] Notice: The portion of the term of this patent subsequent to Sep. 23, 1997, has been disclaimed.

[21] Appl. No.: 8,605

[22] Filed: Feb. 1, 1979

Related U.S. Application Data

[63] Continuation-in-part of Ser. No. 820,444, Aug. 1, 1977, abandoned, which is a continuation of Ser. No. 615,813, Sep. 22, 1975, abandoned.

[51] Int. Cl.³ .................. B29C 17/04; B29D 9/04
[52] U.S. Cl. .................... 264/512; 264/550; 425/387.1
[58] Field of Search ............ 264/550, 551, 549, 554, 264/544, 553, 512, 255; 425/387.1, 388

[56] References Cited

U.S. PATENT DOCUMENTS

| | | |
|---|---|---|
| 2,889,651 | 6/1959 | Baldanza . |
| 3,170,970 | 2/1965 | Adams . |
| 3,321,562 | 5/1967 | Wanderer ............... 425/387.1 X |
| 3,357,053 | 12/1967 | Lyon et al. ............... 264/550 X |
| 3,409,939 | 11/1968 | Hey . |
| 3,412,188 | 11/1968 | Seefluth . |
| 3,468,994 | 9/1969 | Gilbert . |
| 3,471,601 | 10/1969 | Goetgheluck ............... 264/512 |
| 3,471,896 | 10/1969 | Ninneman . |
| 3,489,601 | 1/1970 | Shipp et al. . |
| 3,496,597 | 2/1970 | Ayres . |
| 3,586,748 | 6/1971 | Ayres . |
| 3,602,946 | 9/1971 | Curetti et al. . |
| 3,642,975 | 2/1972 | Duggins et al. ............... 264/314 |
| 3,661,489 | 5/1972 | Moore ............... 425/233 |
| 3,732,348 | 5/1973 | Ignell ............... 264/134 |
| 3,737,496 | 6/1973 | Voorhees, Sr. . |
| 3,739,052 | 6/1973 | Ayers et al. . |
| 3,917,788 | 11/1975 | Padovani ............... 425/388 X |
| 3,923,190 | 12/1975 | Roth ............... 220/67 |
| 3,966,860 | 6/1976 | Hudson et al. ............... 264/292 X |
| 3,995,763 | 12/1976 | Ayres et al. ............... 220/74 |
| 4,120,932 | 10/1978 | Roth ............... 264/292 |
| 4,122,147 | 10/1978 | Vrcelj ............... 264/255 |

FOREIGN PATENT DOCUMENTS

| | | |
|---|---|---|
| 1200794 | 8/1970 | United Kingdom . |
| 1325726 | 8/1973 | United Kingdom . |
| 1345230 | 1/1974 | United Kingdom . |

Primary Examiner—Jan H. Silbaugh
Attorney, Agent, or Firm—Robert A. Stenzel; James W. Ove

[57] ABSTRACT

A process and apparatus for forming a laminated plastic article, especially a container. In one formation sequence, a flattened preform of desired perimeter configuration is formed, which preferably is multilayered, directly from thermoplastic materials. In another formation sequence, a preform is positioned in a thermoforming apparatus wherein, with edge portions of the preform is clamped and the midportions are mandrel-formed into a body having continuous integral side and bottom wall portions. This body is then trimmed and blow-molded to produce a desired product article. Residual portions of the starting preform can be trimmed away from the lip portions of the product article if desired.

5 Claims, 13 Drawing Figures

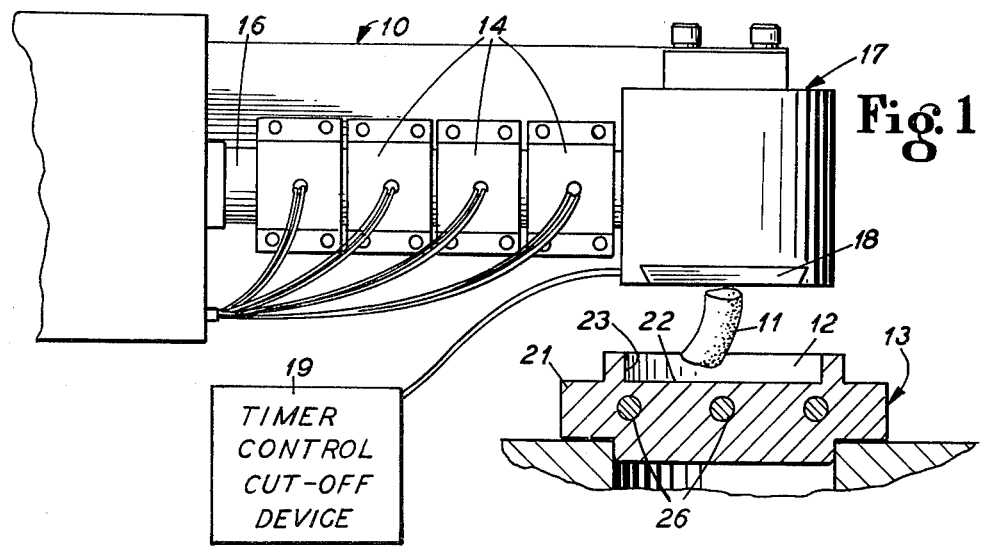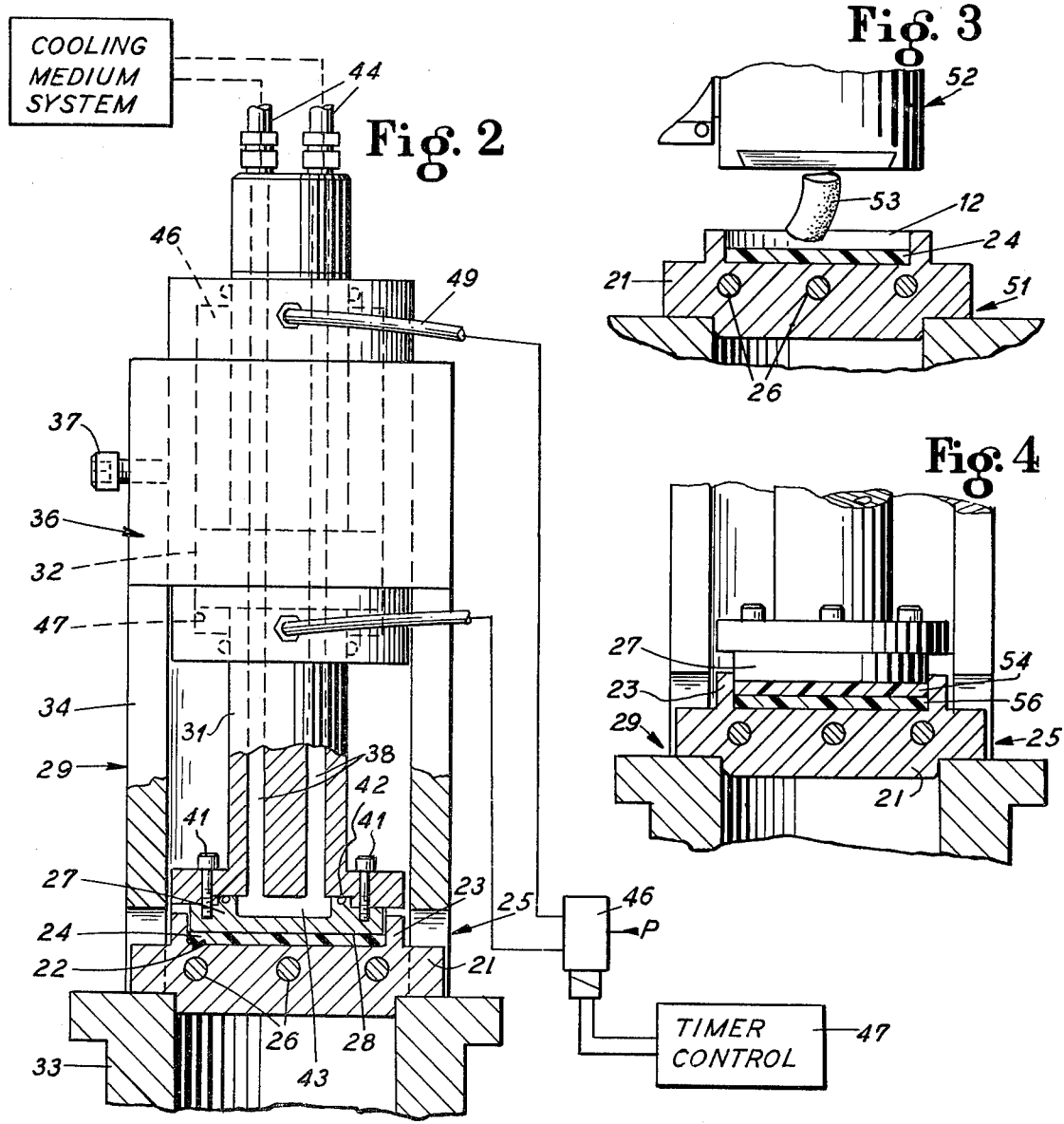

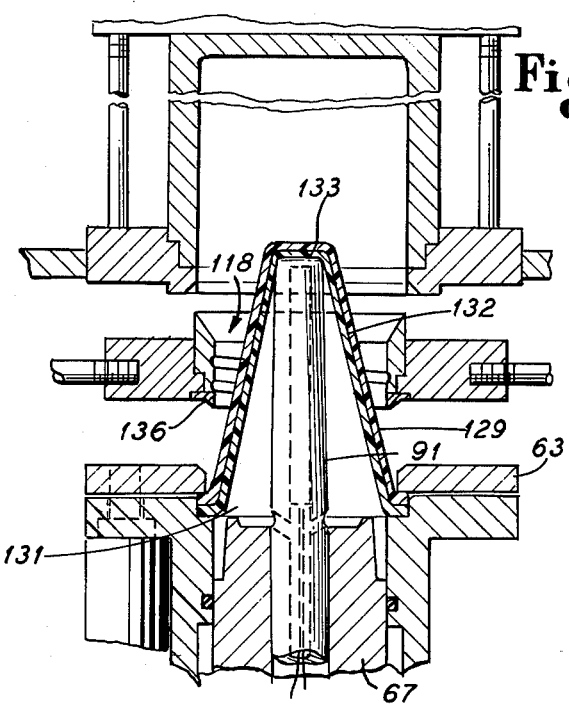
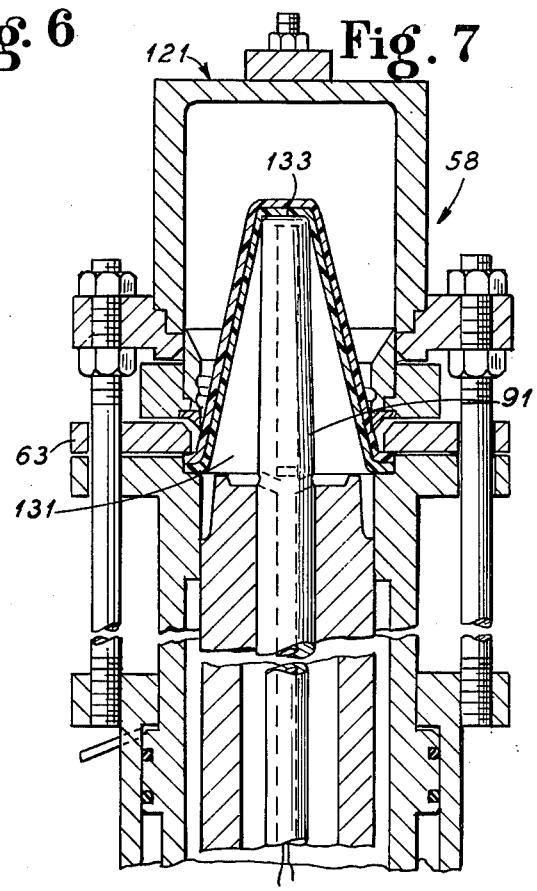
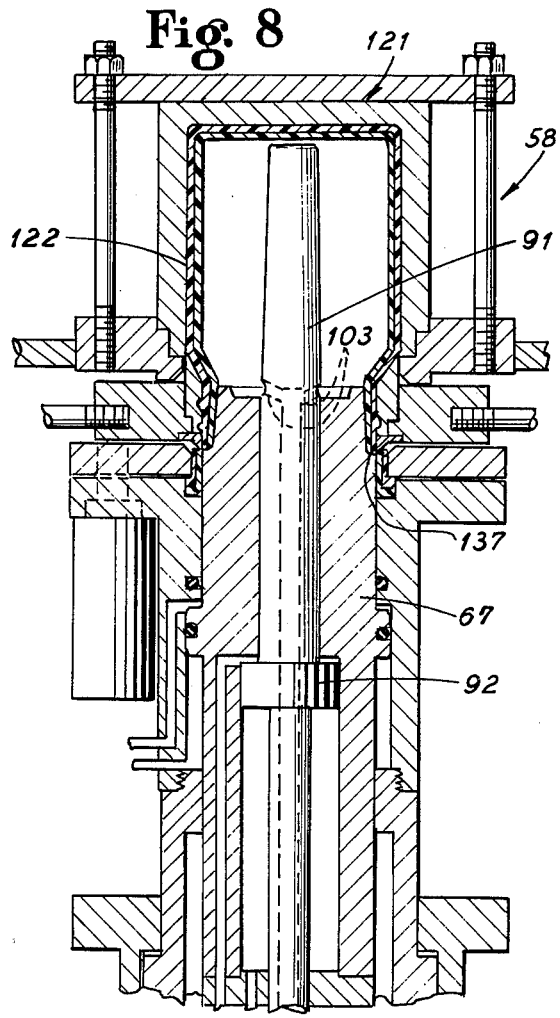
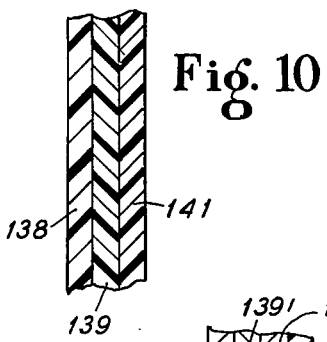
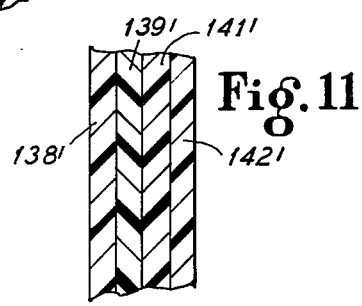

PROCESS FOR FORMING A PLASTIC ARTICLE

RELATED APPLICATION

This application is a continuation-in-part of my earlier filed U.S. Ser. No. 820,444 filed Aug. 1, 1977 now abandoned, which in turn is a Rule 60 Continuation of U.S. Ser. No. 615,813, filed Sept. 22, 1975, now abandoned.

BACKGROUND OF THE INVENTION

This invention lies in the field of improved apparatus and processes for making hollow plastic articles, particularly multilayered plastic articles, such as containers.

Many processes have been advanced for manufacturing hollow plastic articles and some of these processes offer the possibility of making articles formed of a plurality of layers wherein an inner wall can be formed of a plastic material having certain desired properties and also with an outer wall of a plastic material exhibiting other desired properties. For example, Berger U.S. Pat. No. 3,122,598 discloses a process for forming decorative plastic articles using injection molding techniques, Sherman U.S. Pat. No. 2,710,987 discloses a method and apparatus for forming laminated plastic articles using extrusion blow-molding techniques, and Valyi U.S. Pat. No. 3,719,735 discloses a technique for injection blow-molding a multilayered container from a composite parison which is itself formed by injecting a thermoplastic material over a preformed liner.

Previously, I have discovered apparatus and technique for forming multi-walled containers using a preformed thermoplastic sheet member having deposited and shaped thereon a quantity of thermoplastic material. Such preform structure is then thermoformed and blow-molded (see my co-pending application Ser. No. 820,444 filed Aug. 1, 1977 now abandoned).

In order to provide a thermoforming stretch blow-molding technique which can be practiced to produce a container without the necessity for lip formation in a preform and which can be practiced so as to trim during manufacture excess material away from the rim portion thereof, an advance in the new thermoform-stretch-blow molding art is needed.

BRIEF SUMMARY OF THE INVENTION

More particularly, in one aspect this invention provides apparatus and method for manufacturing a thermoformed-stretch-blow-molded container or hollow container-like article directly from thermoplastic materials which need be only heated to a plastic state, selectively deposited and compression molded at a working station for subsequent use in the practice of the present invention.

In another aspect, the present invention provides an apparatus and method for compression molding a flattened preform body of predetermined perimeter configuration (preferably circular) which body preferably is comprised of a plurality of layers with each layer being comprised of a different preselected thermoplastic material.

In still another aspect, the present invention provides an improved method and apparatus forming a flattened preform body into such a desired hollow article using thermoforming-stretch-blow-molding and trimming before the blow molding is carried out.

Other and further objects, aims, purposes, features, advantages, embodiments and the like will be apparent to those skilled in the art from the present invention taken together with the accompanying drawings.

BRIEF DESCRIPTION OF THE DRAWINGS

In the Drawings:

FIG. 1 is a diagrammatic view partly in elevation and partly in section illustrating one embodiment of apparatus suitable for depositing a first thermoplastic material heated to a plastic stage at a forming station in a preform forming sequence of the present invention;

FIG. 2 is a side elevational view of one embodiment of a preform forming apparatus with portions thereof broken away and portions thereof shown in section to illustrate a preform shaping operation using such first so deposited, first thermoplastic material;

FIG. 3 shows a fragmentary portion of the apparatus of FIG. 1 being used to deposit a second thermoplastic material heated to a plastic state at such forming station upon the previously so shaped first thermoplastic material;

FIG. 4 shows a fragmentary portion of the apparatus of FIG. 2 being used to shape a flattened two-layered preform blank of a type adapted for use in the making of a container by the technique of the present invention;

FIG. 6 shows a fragmentary portion of the apparatus shown in FIG. 5 with the mandrel extended subassembly and involved in stretching a starting preform blank in a thermoforming operation to form an intermediate hollow body;

FIG. 7 is a view similar to FIG. 6, but illustrating a thread and neck-forming operation of such hollow body using the apparatus shown in FIG. 5;

FIG. 8 is a view similar to FIG. 6 but illustrating further the neck-forming operation, a lip severing operation, and a blow-molding operation in forming a container by the practice of this invention;

FIG. 10 illustrates an enlarged sectional fragmentary view through a portion of a wall of a container which is similar to that produced in the sequence of operations shown in FIGS. 1 through 8 but wherein the two-layered preform has been replaced by a three-layered preform so as to produce a produce container having three walls, the section shown in FIG. 9 being an enlarged fragmentary view taken through the wall region of a product container;

FIG. 11 is a view similar to FIG. 9 but showing a product multi-wall container comprised of four wall members.

DETAILED DESCRIPTION

Figure 5:
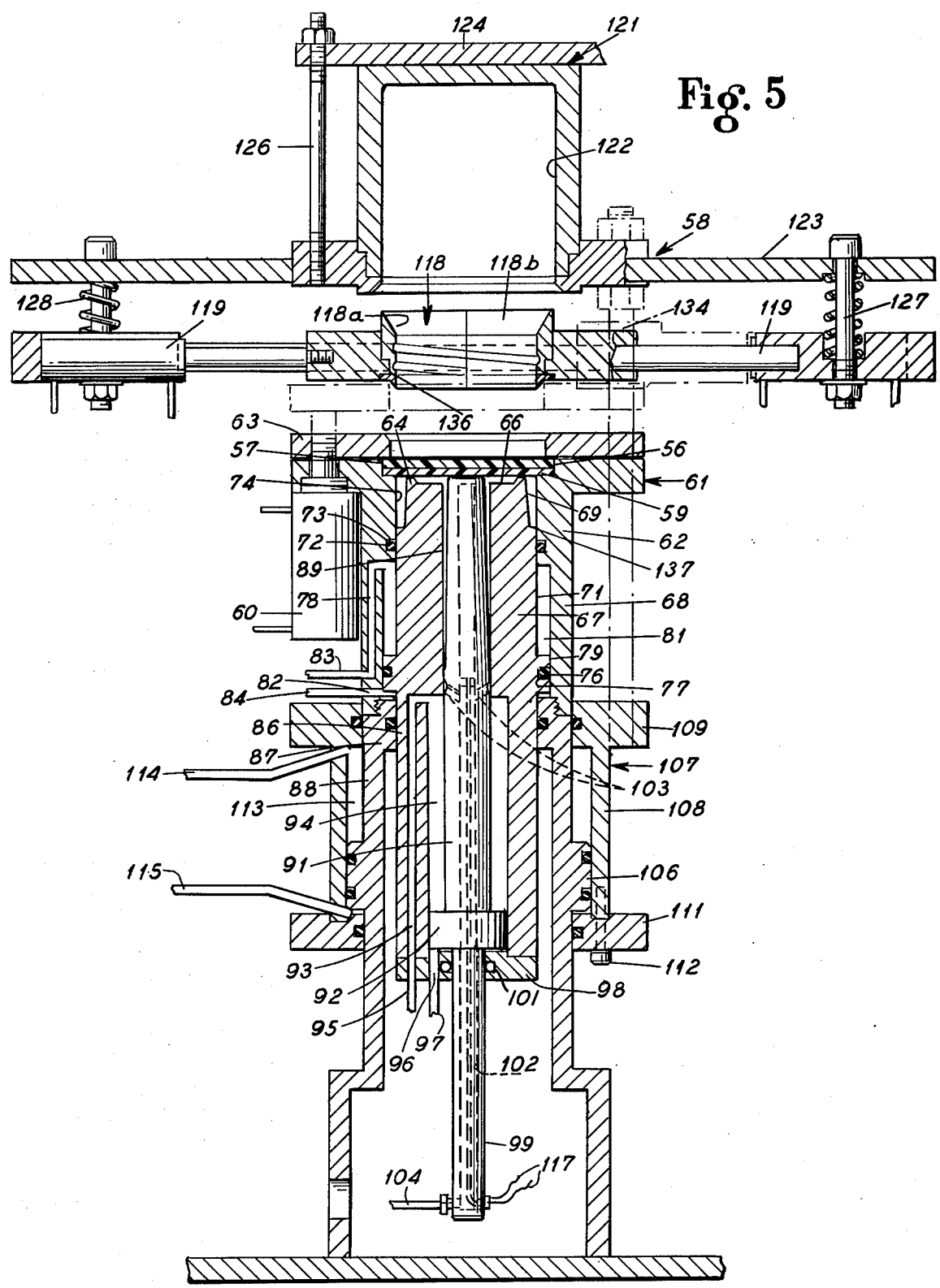
FIG. 5 is a vertical sectional view of one embodiment of container forming apparatus for forming a container from a preform blank such as prepared in FIGS. 1 through 4.

Referring to FIG. 1, there is seen a conventional extruder assembly 10 which is shown operating to deposit a predetermined quantity of a thermoplastic material 11 (which has been heated to a plastic state within extruder assembly 10) into a forming area 12 positioned in a forming station 13. The extruder assembly 10 is provided with a plurality of conventional electrical band heaters 14 which circumscribe principal regions of barrel 16 and operate to regulate the desired internal temperatures being maintained within the barrel 16. An extruder screw (not detailed) is axially disposed within the barrel 16 for moving a plastic material therethrough, as known to those skilled in the art.

The extruder 10 is provided with a nozzle assembly 17 which is threadably connected (not detailed) to the forward end of barrel 16 and which is here internally provided with an L-shaped passageway (not detailed) for purposes of directing a measured quantity of thermoplastic material 11 into forming area 12. While any convenient nozzle assembly may be employed, it is preferred to provide such with a reciprocatable cut off means for producing a desired measured quantity of thermoplastic material 11 therethrough. Here, the mouth of nozzle assembly 17 is provided with a gate plate 18 having an orifice 19 defined therein. Plate 18 is adapted to slide transversely across the mouth of nozzle assembly 17 reciprocally responsive to movements of a fluid cylinder assembly, or the like (not detailed), as desired. The screw of extruder 10 is rotatably driven by a powerhead (typically a combination of electric motor and gear train). To deposit the desired predetermined quantity of thermoplastic material 11 in forming area 12, an electrical timer control 19 is employed to reciprocally actuate the extrudate cut-off device to insure extrudate weight consistancy (here gate plate 18).

The forming area 12 of forming station 13 is here defined by a base block 21 (here, conveniently formed of a metal, such as machined aluminum, or the like), and the forming area 12 has a flattened bottom portion 22 with vertically straight side wall portions 23 upstanding perpendicularly thereto and here illustratively, but preferably, circular in perimeter configuration. The base block 21 is provided with channels 26 to permit the use of electric resistance heater wires, fluid heating, or the like so that the temperature of block 21 can be regulated at a desired level.

Referring to FIG. 2, after the desired quantity of thermoplastic material 11 is deposited in forming area 12, such thermoplastic material 11 is subjected to compression molding so as to produce a flattened preform body 24 which in the illustrative embodiment shown is disc shaped. Conveniently, and as shown, preform body 24 is formed by bottom portion 22, side wall portions 23, and the flat forward face 28 of press head 27. For such compression molding, the base block 21 in the embodiment shown is transferred from the forming station 13 shown in FIG. 1 in subadjacent relationship to extruder assembly 10 to the operating station location 25 shown in FIG. 2 of a compression molding assembly 29.

Molding assembly 29 is supported on a pedestal 33 (on which the base block 21 is also accommodated, as shown) by a frame 34. A double acting fluid cylinder assembly 36 is positioned in frame 34 and located in a predetermined stationary position by an adjustable positioning means, here illustrated by set screw 37 which is threadably extended through frame 34. Axially extending through cylinder assembly 36 is a piston rod 31 which is provided with a pair of longitudinally extending channels 38. At its forward end, rod 31 is flanged and adapted for engagement with press head 27, head 27 being secured to the flange 39 of rod 31 by bolts 41, with an O-ring seal 42 therebetween. Between head 27 and the forward end of rod 31 a chamber 43 is defined. Thus, a temperature regulating fluid is circulatable in chamber 43 via channels 38 and the coupled tubes 44 (paired) threadably engaged with channels 38. When a pressurized fluid (e.g., for example, a gas such as air) is admitted via conduit 49 to the upper chamber 46 of cylinder assembly 36, piston 32 (which is circumferentially fixedly secured to a mid portion of rod 31 by means not detailed but conventional) is moved in a downwards direction in the orientation illustratively depicted in FIG. 2 that head 27 is advanced into engagement with and against material 11. The perimeter of head 27 is such that its outer side walls make sliding engagement with the side wall portions 23. A reversable four way valve assembly 46 regulates the flow of pressurized fluid to cylinder assembly 36 and operation of valve assembly 46 is controlled by electric timer control 47. After preform body 24 reaches the shape shown in FIG. 2 by appropriate pressures being reached and maintained for an appropriate conditioning time in chamber 46, valve 46 is reversed, and lower chamber 47 of cylinder assembly 36 is pressurized and upper chamber is depressurized.

The preform body 24 and base block 21 are then separatable from molding assembly 29.

Preform body 24 can then be removed from base block 21 for use as such in the practice of this invention, or the preform body 24 can have (preferably) another layer of a thermoplastic material added thereto by some procedure such as follows: The base block 21 is separated from molding assembly 29 and positioned at a forming station 51, referring to FIG. 3, where an extruder assembly 52 operates to deposit a predetermined quantity of another thermoplastic material 53 (which has been heated to a plastic state within extruder assembly 52) into the forming area 12 of base block 21. The forming station 51 and the extruder assembly 52 can be similar in construction and operation to the forming station 13 and the extruder assembly 10, as those skilled in the art will appreciate.

After the desired quantity of thermoplastic material 53 is deposited in forming area 12 on preform body 24, such thermoplastic material 53 is subjected to compression molding such as shown in FIG. 4 so as to produce a flattened layer 54 over preform body 24, the resulting composite two layered structure being herein termed preform body 56. Conveniently, and as shown, flattened layered 54 is formed by the upper face of body 24, side wall portions 23, and the flat forward face 28 of press head 27. For such compression molding, the base block 21 in the embodiment shown is transferred from the forming station 51 to the operating station 25, as indicated in FIG. 4, of the compression molding assembly 29. Such assembly 29 is then operated, similarly to the mode described above in connection with the preform body 24, to produce the preform body 56.

Compression molding operations to make preform bodies, such as bodies 24 and 56, are preferably preformed above the glass transition temperatures of the particular thermoplastic material being formed. Exact temperature and pressure conditions vary depending upon many variables, including the particular type of plastic employed, the speed of formation (e.g., machine cycle time), preform size and shape characteristics, and the like, as those skilled in the art will readily appreciate.

A preform, such as a preform 24 or 56, can be removed from a body 21 by any convenient technique, but it is convenient to employ fluidically actuated ram (not detailed), vacuum head pick-up device (not detailed), or the like, as desired. On a laboratory scale, any excess can be manually removed; however, in an automatic machine, any excess can be removed mechanically or fluidically, as with an air knife, or otherwise, as desired or convenient, as those skilled in the art will appreciate.

The preform body 56, after removal from base block 21, is positioned in the forming station 57 of the thermoforming stretch blow apparatus 58 (see FIG. 5). Station 57 is defined here by the shoulder 59 formed in the head portion 61 of lower frame 62 of apparatus 58. The depth of shoulder 59 is slightly less than the thickness of preform body 56 so that a clamping ring 63, when mounted over head portion 61 and actuated thereagainst by fluid cylinder assemblies 60, holds preform body 56 securely at its opposed facial peripheral rim edge portions.

The lower face of preform body 56 (as shown in FIG. 5) is shown in a contacting relationship with the circumferentially located upstanding rim portion 64 of the head end 66 of forming piston 67. Piston 67 is shown in FIG. 5 in its retracted configuration when it is below preform body 56 and housed within the housing portion 68 of lower frame 62. The region 69 of piston 67 adjacent end 66 is tapered (for reasons as hereinbelow explained) and the circumferential side wall 71 of piston 67 is adapted to make sliding engagement with the adjacent cylindrical inner wall portions 74 of housing portion 68. A seal therebetween is achieved by O-ring 72 nested in a groove 73 provided in wall portions 74. An enlarged diameter for wall portions 74 in housing portion 68 radially opposite mid-portions of piston 67, generally as shown in FIG. 5, thereby providing a chamber 81 therebetween. A shoulder 79 formed in piston 67 extending radially outwardly therefrom slidably engages adjacent regions of wall portions 74, and a seal therebetween is provided by O-ring 76 nested in a groove 77 formed in the outer circumference of shoulder 79. A channel 78 formed in housing portion 68 provides fluid access to the upper portion of chamber 81 on the upper side of shoulder 79 while a channel 82 formed in housing portion 68 provides fluid access to the lower portion of chamber 81 on the lower side of shoulder 79. Thus, when a pressurized fluid, such as air, enters channel 78 via a tube 83 interconnecting therewith, piston 67 is moved downwards, while, when such a pressurized fluid enters channel 79 via a tube 84 interconnecting therewith, piston 67 is moved upwards (away from the position shown in FIG. 5). Reciprocal sliding movements of piston 67 are further stabilized by the sliding engagement of circumferential upper tail portions 86 of piston 67 with a radially inwardly extending shoulder 87 defined in a lower housing portion 88 of frame 62. Lower housing portion 88 here threadably interconnects with housing portion 68, as shown. Sleeve within a sleeve cylinder assembly type construction is more preferred (not detailed herein).

Piston 67 has an axially extending bore 89 defined therein which, in the tail portions 86 of piston 67, has an enlarged diameter relative to adjacent upper portions thereof. A mandrel 91 slidably engages upper portions of bore 89, and a lower mid-portion of mandrel 91 is provided with a shoulder 92 which has circumferential outer walls that slidably engage the inner circumferential walls of the enlarged diameter portions of bore 89.

A channel 93 longitudinally extends in the wall of tail portions 86 to open into the upper end portion of the chamber 94 thus defined between mandrel 91 and tail portions 86; channel 93 interconnects with a tube 95 at its opposite end. Another channel 96 longitudinally extends in the wall of tail portions 86 to open into the lower end portion of the chamber 94; Channel 96 interconnects with a tube 97 at its opposite end. Since shoulder 92 is interposed between lower and upper portions of chamber 94, the mandrel 91 is moved reciprocably relative to piston 67 by fluid pressure exerted as desired on one or the other of the longitudinally opposed side faces of shoulder 92, as those skilled in the art will appreciate. A cap plate 98 mounted across the lower end of piston 67 (by bolts, now shown) encloses the lower end of chamber 94, and a rearward axially extending leg 99 projects therethrough slidably but sealingly (owing to O-ring 101). Mandrel 91 is provided with an axial channel 102 extending continuously therethrough except at opposite ends of mandrel 91. Radially extending channels 103 join with channel 102 in the gradually tapered forward end portions of mandrel 91.

A tube 104 joins the lower end of channel 102. Thus, a pressurized fluid (such as compressed air or the like) when admitted by tube 104 can be ejected through the terminal apertures of channels 103, and the leg 99 permits such a pressurization when the mandrel 99 has been raised relative to piston 67 by pressurized fluid being admitted to tube 97 and channel 96 causing shoulder 92 to slide upwardly in chamber 94.

As suggested above, the outside wall regions of housing portions 68 and 88 are each cylindrical and substantially coextensive with one another except for the radially outwardly extending shoulder 106 integrally formed on housing portion 88. A primary frame assembly 107 (here comprised of a sleeve 108, a collar 100, integral therewith across the upper end thereof, and a collar 111 across the lower end thereof and bolted thereto sealingly by bolts 112) is circumferentially located about housing portion 88 so that collars 109 and 111 have shoulder 106 located therebetween which is reciprocally slidable longitudinally relative to the outside walls of housing portion 88. In effect, because of a spacing radially between such outside walls of housing portion 88, a chamber 113 is defined therebetween in which shoulder 106 rides.

Figure 9:
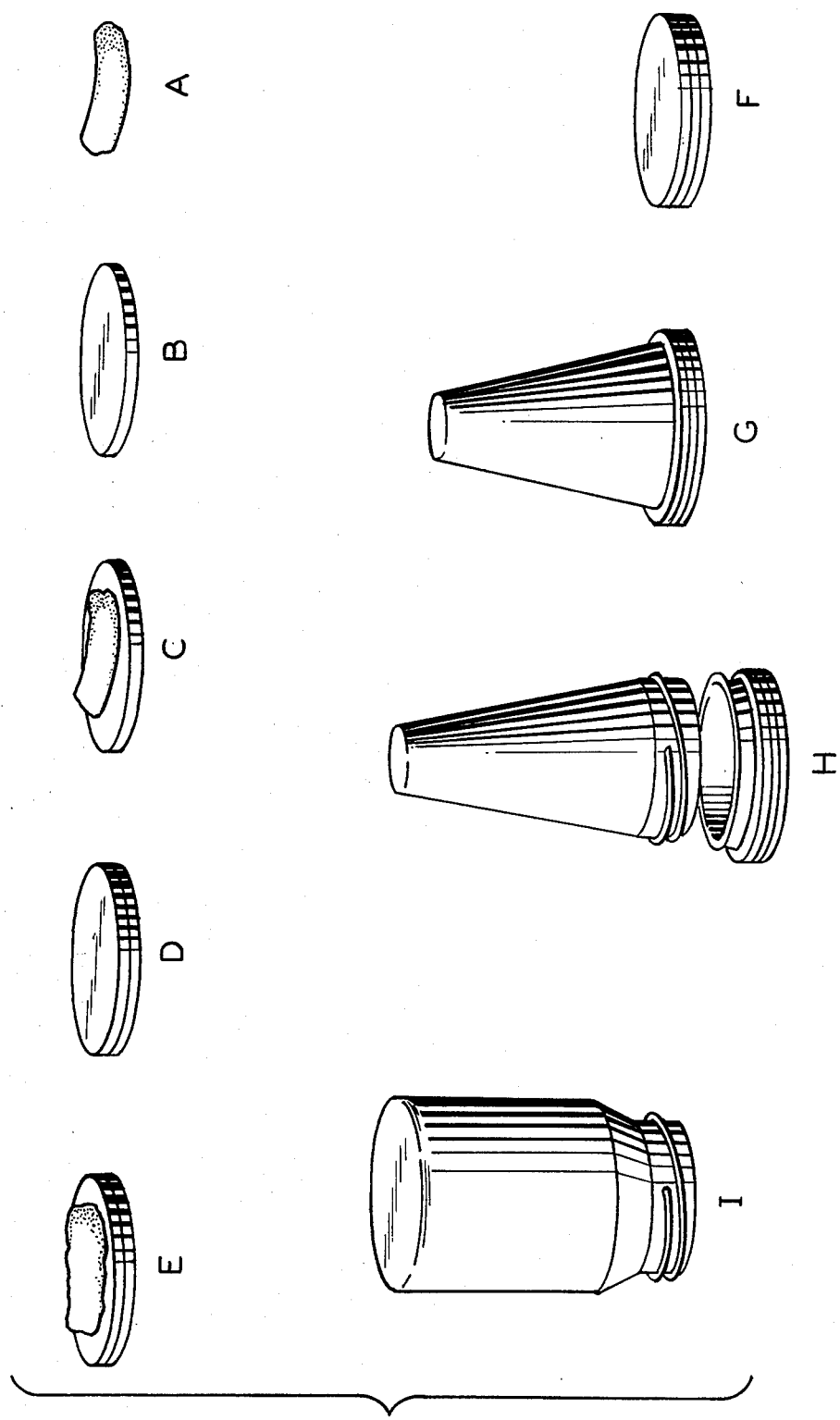
FIG. 9 is a diagrammatic perspective view of successive stages in container formation by the practice of this invention as accomplished using the apparatus, for example, of FIGS. 1, 2 and 5, but with all apparatus elements removed for greater clarity of presentation.

Referring to FIG. 9, there is seen illustrated the appearance of a three walled container at various successive stages in its production by the practice of the present invention. The appearance of a preform being manufactured is shown at stages A, B, C, D, E and F.

The sequence of manufacture involves the deposition of a predetermined quantity of thermoplastic material into a mold followed by the compression molding of the deposited mass into a flattened body. In general, the preform construction resulting at each of stages B, D or F has a transverse width (average) to thickness (generally uniform) of at least about 2:1, the exact perimeter construction of any given preform, of course, being dependent upon many processing and article limitations (including the exact configuration and characteristics of the manufacturing mechanism being used to convert the preform subsequent to its manufacture into a finished article.

Steps G, H and I illustrate the thermoforming, stretching, trimming and blow molding sequence provided by the practice of the present invention and hereinabove more specifically described in relation to FIG.

5 and subsequent figures (together with the accompanying text of the specification). The configurations shown in G, H and I are believed to be self explanatory and are believed to be helpful in illustrating the progressive phase in the manufacture of a container by the practice of the present invention.

When a compressed fluid such as a gas comprised of air or the like is admitted to the chamber 113 through the conduit 114, the shoulder 106 is moved downwardly as a result of which the entire assembly comprised of mandrel 91, piston 67, frame 62 and 88 is moved downwardly into the position generally shown in FIG. 5. On the other hand, when a compressed fluid is admitted through channel 115, the entire indicated assembly is advanced upwardly along the axis thereof, all as will be more fully explained hereinafter. The movement occurring relative to primary frame 107.

For temperature control reasons, the mandrel 91 is provided with a heating means, here illustrated as an electrical heater which is supplied with electric power via wires 117.

Positioned generally coaxially with the mandrel 91 is a bottle neck forming assembly herein designated in its entirety by the numeral 118. In the embodiment shown, the assembly 118 is comprised of a pair of mating halves 118a and 118b. To provide a means for opening and closing such halves a pair of fluid cylinder means 119 is used which are arranged so as to be in opposed relationship one to the other thereof, as shown.

Positioned generally coaxially with the mandrel 91 is a female mold assembly 121 which incorporates a mold cavity 122 and which is positioned in superadjacent but spaced relationship to the neck forming assembly 118 coaxially with the mandrel 91. The mold cavity 122 is mounted to the mold mounting plate 123 by a cap plate 124 which compression mounts the mold cavity 122 to the mold mounting plate 123 through the use of tie rods 126 which at one end engage the mold mounting plate 123 and at the other end are bolted to the cap plate 124, as shown. As those skilled in the art will appreciate, any convenient female mold assembly can be employed in the practice of the present invention.

The fluid cylinders 119 are each suspended from the mold mounting plate 123 by shoulder bolts 127. In order to provide means urging the neck forming assembly 118 from disengagement with the mold cavity 112 each of the bolts 127 is here provided with a coiled compression spring 128.

The operation of the apparatus 58 is illustrated in FIGS. 6 through 8. Briefly, a thermoplastic preform flattened plate member 56 is first clamped in position using the clamping ring 63. As those skilled in the art will appreciate, the preform 56 is previously temperature conditioned.

The mandrel 91 is then moved against the adjacent face of the preform 56 by fluidic pressure until the mandrel has stretched the preform into the configuration generally shown in FIG. 6. At this point, the initial preform 56 is in the form of a hollow article 129 having a mouth 131 and integral side walls 132 and an end wall 133.

Now, the piston or second tapered mandrel-like body 67 which surrounds the first mandrel 91 is projected through the mouth 131 with the mandrel 91 stationary thereby engaging outside perimeter portions of the piston 67 with inside perimeter portions of article 129 adjacent the mouth 131 thereof. Concurrently, outside perimeter portions of the article 129 are brought into contact with inside wall portions of the neck forming assembly 118 in a generally mating engagement. To accomplish such a relationship, the primary frame 107 is moved downwardly by appropriately being charged with pressurized fluid into chamber 113. This results in a pull-down of the female mold assembly 121 against the neck forming assembly 118 and then, as the pull-down continues bringing the neck forming assembly 118 into adjacent relationship to the clamping ring 63. The tie rods 134 bolt the female mold assembly 121 to the shoulder 109 of the primary frame 107.

The neck forming assembly 118 is provided with a trim die 136 having a cutting edge defined therein which is located in adjacent relationship to the article 129. The piston 67 has an axially upwardly facing shoulder 137 defined thereon at the inner end of the taper 69. Sufficient fluid pressure is exerted upon the piston 67 to cause same to move axially upwardly (in the embodiment shown) so as to result in a cutting action between the trim die 136 and the die shoulder 137 thereby cutting away residual portions of the article 129 about the perimeter of the mouth 137 thereof. Concurrently, a seal is formed between the article 129 and the piston 67 in the region of the mouth 131.

The interrelationship between the mold cavity 122, the neck forming assembly 118, the container 129, and the piston 67 is illustrated in FIG. 7 with the apparatus 58 in its closed configuration. The configuration of the apparatus 58 at the time when severing of residual material from the container 129 is completed is illustrated in FIG. 8 except that in FIG. 8, the interior regions of the article 129 have been pressurized by a fluid injected thereinto, the pressure of the fluid injected being sufficient to enlarge the volume of the article 129 to an extent sufficient to conform the side and end wall portions 132 and 133, respectively, thereof against the interior forming walls of the female mold assembly 121, such assembly being located outwardly of the container 129. It will be noted that the formed container has a larger diameter body portion than the diameter of the formed neck portion.

Those skilled in the art will appreciate that containers having one or a plurality of layers in its wall portions can be produced by the practice of the present invention but it is presently preferred to use the technology of the present invention to produce multi-walled containers. While the preceding illustrative operation of the apparatus shown in FIG. 5 employs a two-layered preform, three, four or more layers in a preform can be employed. The same operational steps of thermoforming, stretching, trimming and blowing are followed in each instance. The appearance of a multi-walled container containing three and four, respectively, layers in its side wall and bottom portions is illustrated by the fragmentary enlarged cross-sectional views shown, for convenience, in FIGS. 10 and 11.

For example purposes, in FIGS. 10 and 11, the layers 138 and 138' may be regarded as inside layers of a container wall. Each of the layers 138 and 138' may be considered to be comprised of a structural polymeric material such as polystyrene, polycarbonate, or the like. In contacting adjacent relationship to the structural layer 138 and 138' is a barrier layer 139 and 139', respectively. Each of these barrier layers can be considered to be a polymeric material which is adapted to offer resistance towards the passage therethrough of water vapor, for example. In adjacent contacting relationship to the respective layers 139 and 139' is another barrier layer, in each instance, identified by the respective numerals 141 and 141'. Each of these barrier layers can be considered to be, for example, comprised of a polymeric material which is adapted to be resistant to the passage therethrough of a gas such as oxygen, $CO_2$, or the like.

Finally, if desired, and as illustrated in the embodiment shown in FIG. 11, another structural layer of a thermoplastic material can be mounted in adjacent relationship to the barrier layer 141', such additional structural layer being designated herein by the numeral 142'. Examples of suitable polymers for use as barrier layers include polyolefins, polyvaniladene chloride, acrylonitrile polymers containing at least 50 weight percent of acrylonitrile (on a 100 weight percent total polymer weight basis), such as the acrylonitrile polymer type available commercially from Sohio under the trademark "Barex", and the like.

Referring to FIG. 9, there is seen illustrated the appearance of a three walled container at various successive stages in its production by the practice of the present invention. The appearance of a preform being manufactured is shown at stages A, B, C, D, E and F.

The sequence of manufacture involves the deposition of a predetermined quantity of thermoplastic material into a mold followed by the compression molding of the deposited mass into a flattened body. In general, the preform construction resulting at each of stages B, D or F has a transverse width (average) to thickness (generally uniform) of at least about 2:1, the exact perimeter construction of any given preform, of course, being dependent upon many processing and article limitations (including the exact configuration and characteristics of the manufacturing mechanism being used to convert the preform subsequent to its manufacture into a finished article.

Steps G, H and I illustrate the thermoforming, stretching, trimming and blow molding sequence provided by the practice of the present invention and hereinabove more specifically described in relation to FIG. 5 and subsequent figures (together with the accompanying text of the specification). The configurations shown in G, H and I are believed to be self explanatory and are believed to be helpful in illustrating the progressive phase in the manufacture of a container by the practice of the present invention.

As will be appreciated by those skilled in the art, the type of preform structure employed in the practice of the technology of the present invention can vary widely. For example, a preform can be employed in the present invention which has been produced by the teachings of my co-pending application Ser. No. 008,607 filed on even date herewith. The entire disclosure and teachings of such application are incorporated herein by reference.

Figure 12:
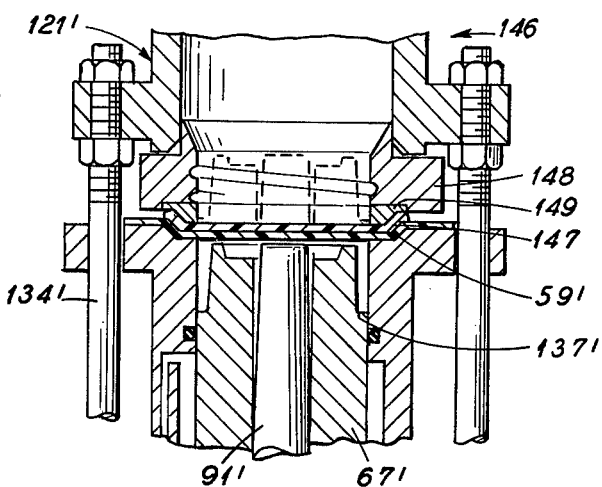
FIG. 12 is a fragmentary view similar to FIG. 5 taken in the preform placement region but showing an alternative embodiment.

Referring to FIG. 12, there is seen an alternative embodiment of the apparatus 58 shown in FIG. 5, such alternative embodiment being herein designated in its entirety by the numeral 146. Portions of apparatus 146 which are similar to those of apparatus 58 are similarly numbered but with the addition of prime marks thereto for convenience. In apparatus 146, the preform body 147 employed has been produced by practicing the teachings in the afore-described specification whereby a thermoplastic mass is deposited upon a preform sheet member and shaped thereon after which the composite structure is compression molded to produce the dished-like structure cross sectionally depicted in FIG. 12 as preform 147. The shoulder 59' is shaped so as to accommodate the preform 147. No separate clamping rings such as ring 63 is employed; rather, the thread plate 148 and the die 149 are employed to clamp the preform 147, as shown in FIG. 12, the apparatus 146 being in its axially interengaged subassembly mode similar to the mode illustrated for apparatus 56 in FIG. 7.

Figure 13:
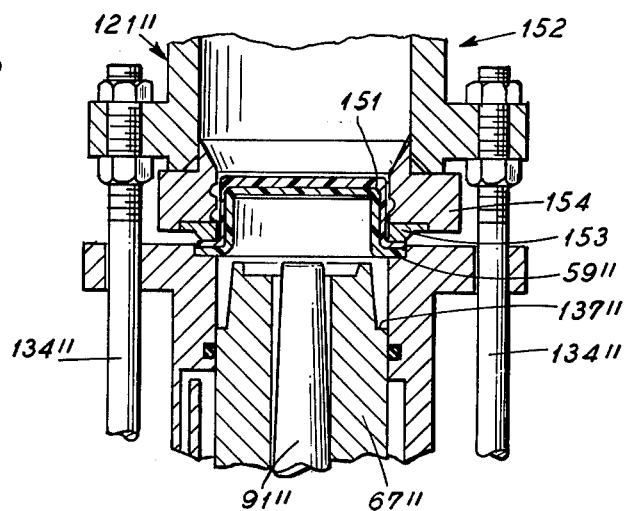
FIG. 13 is a view similar to FIG. 12 but showing a further alternative embodiment.

FIG. 13 illustrates another embodiment wherein a preform 151 is employed. Here, the preform 151 is prepared as described in such above noted co-pending co-filed application of mine. The apparatus 58 has been modified to produce the embodiment designated in FIG. 13 as 152. In apparatus 152 components which are similar to those in the FIG. 5 apparatus are similarly numbered but with the addition of double prime marks thereto. Here, the preform 151 is clamped into position by a combination of cutting die 153 and thread plates 154. The apparatus 152 is shown in its interengaging relationship comparable to the relationship shown for the apparatus 58 in FIG. 7.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto-appended claims.

I claim:

1. A process for plastic container manufacture comprising the steps of:
   (A) supporting a preformed thermoplastic member in a forming position adjacent the mouth of a female container neck forming member which in turn is adjacent the mouth of a blow mold member having a cavity therein and clamping peripheral portions of said thermoplastic member,
   (B) relatively movably projecting a first male forming body into a face of said thermoplastic member to stretch and form the inward portions of said thermoplastic member into a hollow article having an aperture within said peripheral portions and also having integral side and end wall regions, which wall regions extend through said female container member and into said blow mold cavity,
   (C) movably projecting a second male forming body, which surrounds said first male forming body, into the inside of said article through said aperture to cooperate with said female container neck forming member and compression mold a neck region in said hollow article adjacent to said aperture, and sealingly close said aperture,
   (D) said female container neck forming member further including trimming surfaces associated with said mouth thereof, and said second male forming body, at the termination of said projecting, being brought into a cooperating trimming engagement with said trimming surfaces, thereby severing said peripheral portions from said article, and then
   (E) pressurizing the interior of said sealed hollow article by injecting a fluid thereinto to enlarge the volume of said hollow article to an extent sufficient to generally conform said wall regions against said cavity, thereby forming said article into a container.

2. The process of claim 1 wherein said container has a neck portion which has a smaller cross-sectional area than a body portion thereof.

3. The process of claim 1 wherein before step (A), a measured quantity of thermoplastic material is extruded into a heated forming area, and said quantity is compression molded into a generally flattened said thermoplastic member and a predetermined quantity of another thermoplastic material is deposited on said flattened thermoplastic member and said other thermoplastic material is compression molded over said flattened thermoplastic material and the resulting composite is finally transferred to said forming position as said preformed thermoplastic member.

4. The process of claim 3, wherein before such final transferring a predetermined quantity of a third thermoplastic material is deposited on said composite and said thermoplastic material is compression molded over said other thermoplastic material and the resulting three layered composite is then transferred to said forming position.

5. The process of claim 1, wherein said thermoplastic member is comprised of a plurality of layers each of which is comprised of a different thermoplastic material.

* * * * *